United States Patent
Perng et al.

(12) 
(10) Patent No.: US 7,836,345 B2
(45) Date of Patent: Nov. 16, 2010

(54) PERSONAL COMPUTER DIAGNOSTIC TEST BEFORE EXECUTING OPERATING SYSTEM

(75) Inventors: Chiy-Ferng Perng, Taipei (TW); Hsien-Shan Wang, Taipei (TW); Wei-Ming Huang, Taipei (TW); Hung-Ming Tsao, Taipei (TW)

(73) Assignee: Asustek Computer Inc., Taipei (TW)

( * ) Notice: Subject to any disclaimer, the term of this patent is extended or adjusted under 35 U.S.C. 154(b) by 359 days.

(21) Appl. No.: 11/773,809

(22) Filed: Jul. 5, 2007

(65) Prior Publication Data
US 2008/0010486 A1 Jan. 10, 2008

(30) Foreign Application Priority Data
Jul. 6, 2006 (TW) .............................. 95124697 A

(51) Int. Cl.
*G06F 11/00* (2006.01)
(52) U.S. Cl. ........................................................ 714/36
(58) Field of Classification Search .................... 714/36
See application file for complete search history.

(56) References Cited

U.S. PATENT DOCUMENTS

| 6,449,735 | B1 | 9/2002 | Edwards et al. | |
|---|---|---|---|---|
| 7,555,683 | B2 * | 6/2009 | Gronemeyer et al. | 714/55 |
| 2007/0043882 | A1 * | 2/2007 | Natarajan et al. | 710/8 |
| 2008/0010486 | A1 * | 1/2008 | Perng et al. | 714/3 |

OTHER PUBLICATIONS

Yuang-Xiang Guo, Brief description for self-checking process of computer startup, Jun. 2001, p. 32-33, vol. 18, No. 2, The Journal of Jinzhong Teachers College.

* cited by examiner

*Primary Examiner*—Michael C Maskulinski
(74) *Attorney, Agent, or Firm*—Rabin & Berdo, PC

(57) ABSTRACT

A personal computer component diagnostic method is executed to recognize the status or potential problems of a computer before executing an operating system. The personal computer component diagnostic method comprising: calling a BIOS program; executing a component basic diagnostic program; and executing a component functional test after executing a predetermined step. The component functional test includes a CPU MSR/MTRR test, a hard disk S.M.A.R.T. test, a boot path test and a PCI device scanning test.

8 Claims, 6 Drawing Sheets

PERSONAL COMPUTER DIAGNOSTIC TEST BEFORE EXECUTING OPERATING SYSTEM

RELATED APPLICATIONS

This application claims priority to Taiwan Application Serial Number 95124697, filed Jul. 6, 2006, which is herein incorporated by reference.

BACKGROUND

1. Field of Invention

The present invention relates to a personal computer component diagnostic module and test thereof. More particularly, the present invention relates to personal computer component diagnostic test before executing an operating system.

2. Description of Related Art

Without a software operating system, i.e. Windows operating system, users cannot recognize a status or potential problems of a conventional personal computer. Conventional BIOS is equipped with component basic diagnostic program, i.e. detecting whether hardware exists or not. After the BIOS component basic diagnostic program is executed, the software operating system can be loaded and operated.

In case a BIOS component basic diagnostic program is executed and the software operating system cannot be loaded, an engineer uses "trial and error" methods to fix a personal computer in addition to using low level equipment. However, it is necessary to have extra components to execute a "trial and error" method. Without extra components, a "trial and error" method is of no use. Moreover, users often seek help from the PC system suppliers even if the actual problem occurs in some component.

For the forgoing reasons, there is a need for a PC component diagnostic method before executing an operating system.

SUMMARY

It is therefore an objective of the present invention to provide a PC component diagnostic method to recognize the status or potential problems of a computer without an operating system being loaded.

In accordance with the foregoing and other objectives of the present invention, a personal computer component diagnostic method is executed before executing an operating system. The personal computer component diagnostic method comprising: calling a BIOS program; executing a component basic diagnostic program; and executing a component functional test after executing a predetermined step. The component functional test includes a CPU MSR/MTRR test, a hard disk S.M.A.R.T. test, a boot path test and a PCI device scanning test.

Therefore, this component diagnostic method can assist users or agents to recognize the computer status or potential problems without a Windows operating system such that a motherboard, a back bone system or a notebook PC need not be sent back to its supplier more often than not.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
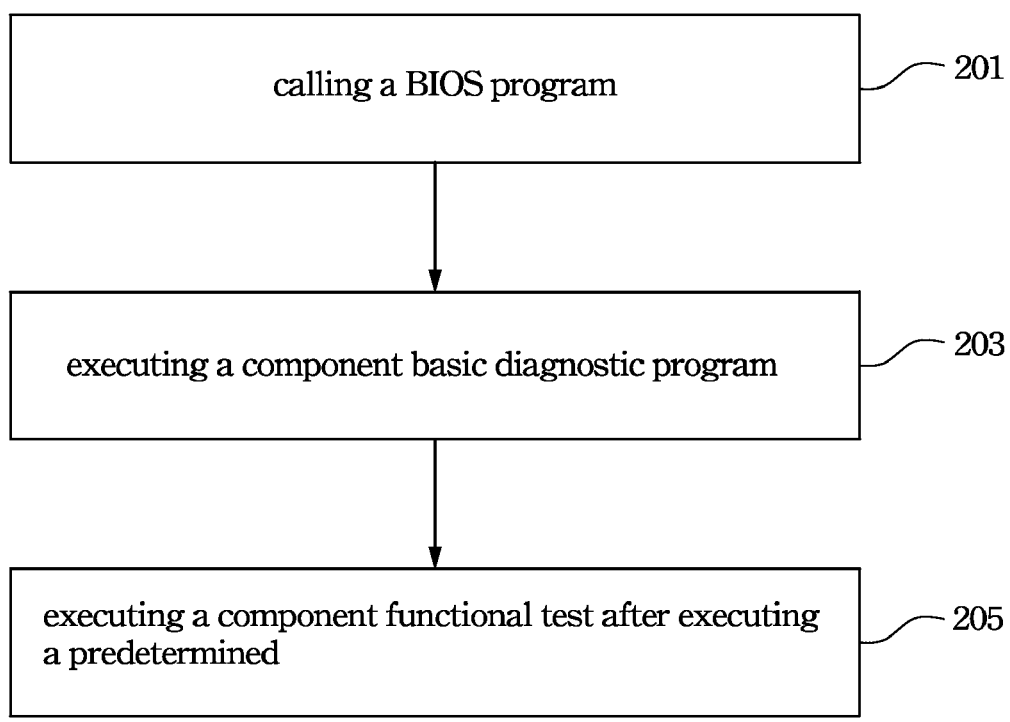
FIG. 1 is a flowchart of personal computer component diagnostic test according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a flowchart of personal computer component diagnostic test according to one preferred embodiment of this invention. In step 201, a BIOS program is called. In step 203, a component basic diagnostic program, i.e. detecting the hard disk configuration, is executed. In particular, when detecting the hard disk configuration is executed, a command (referred to as a basic command) is sent to a hard disk controller, and a response is sent back from the hard disk controller to provide information on the hard disk type or whether this hard disk supports S.M.A.R.T. (Self-Monitoring, Analysis, and Reporting Technology) or not, etc. In step 205, a component function test is executed after executing a predetermined step and before an operating system is executed. The predetermined step can be any step after step 203 and before the component functional test is executed. In this embodiment, the predetermined step initializes a display device such that the component functional test result can be displayed on the display device. The component functional test can further detect potential errors that the component basic diagnostic program (step 203 cannot detect). For example, the hard disk can merely be recognized as a hard disk with S.M.A.R.T. functionality in step 203, but further tests, i.e., a rotation speed test, can be executed in step 205.

Figure 2:
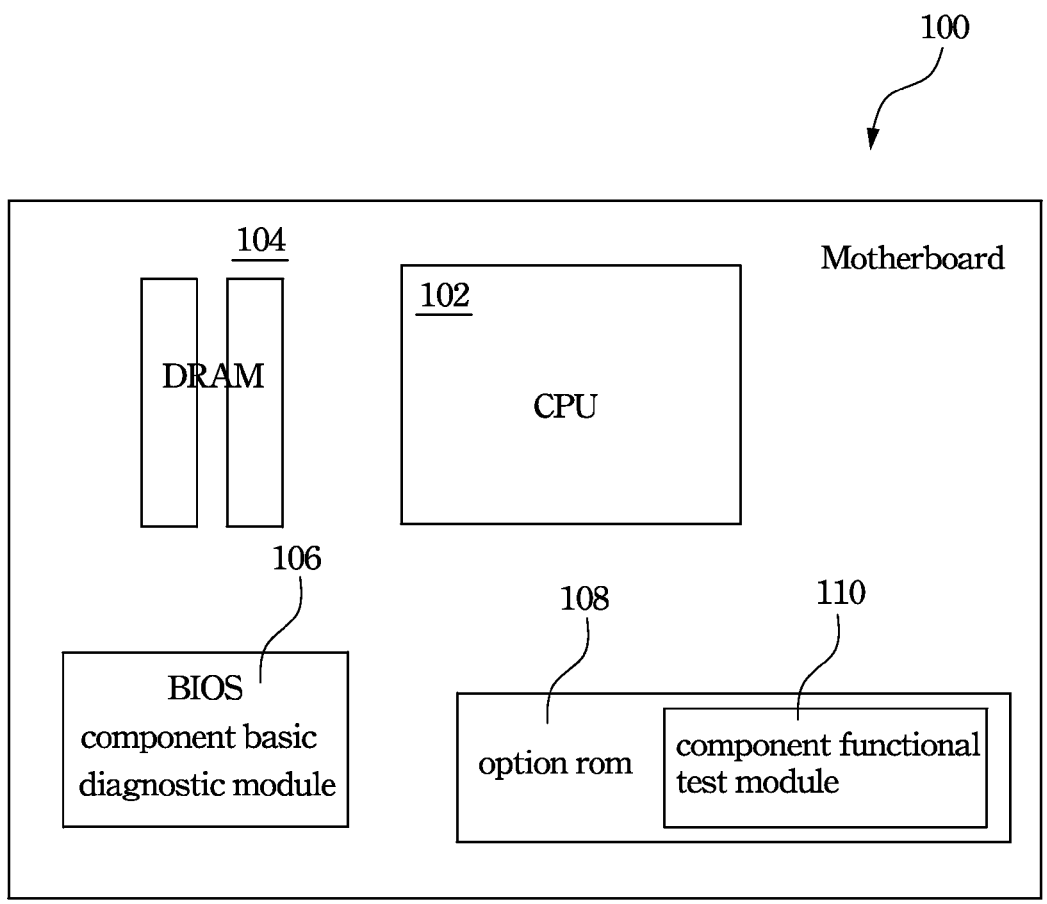
FIGS. 2, 3 and 4 respectively illustrate three different embodiments of PC component diagnostic module on the motherboard according to one preferred embodiment of this invention.
Figure 3:
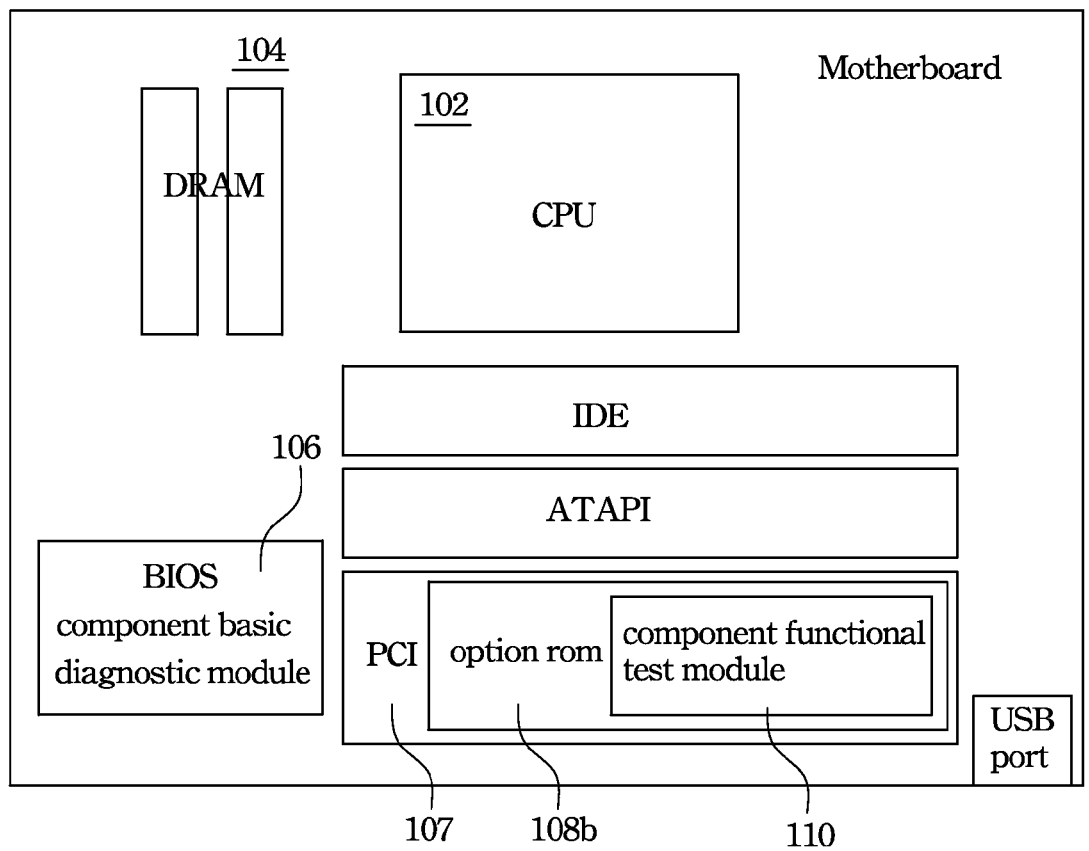
Figure 4:
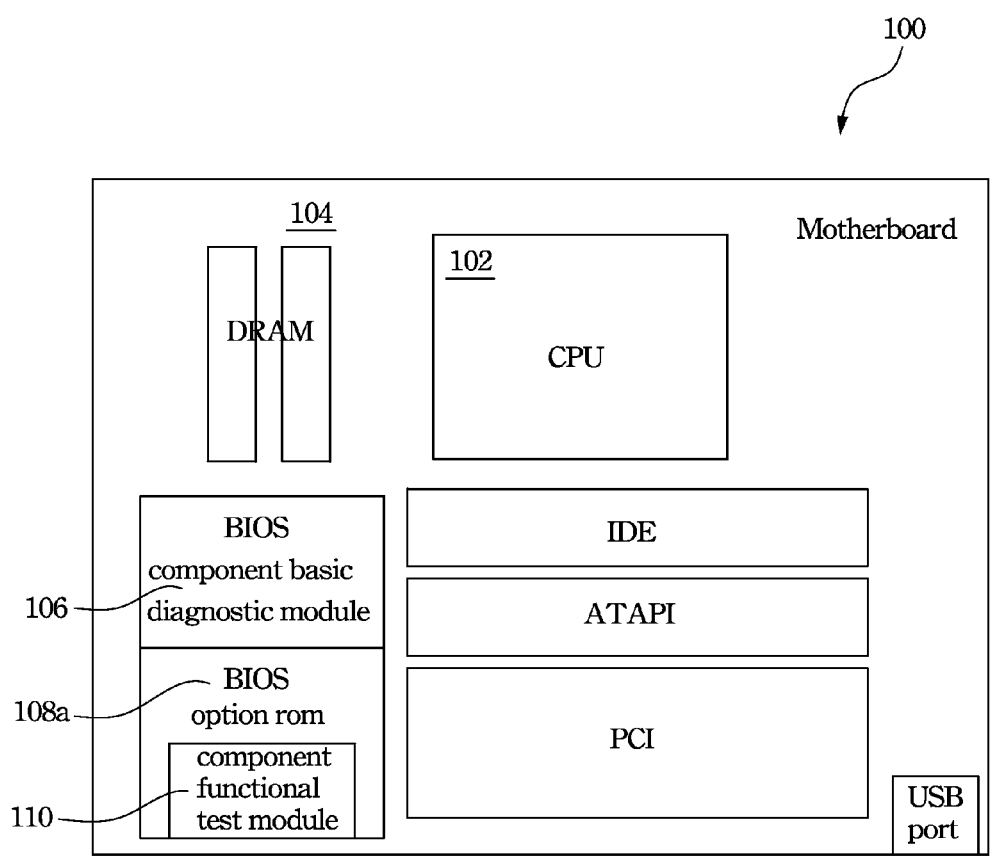

FIGS. 2, 3 and 4 respectively illustrate three different embodiments of the PC component diagnostic module on the motherboard according to one preferred embodiment of this invention. The component functional test (step 205) is executed by a component functional test module, which is installed as an optional ROM on the motherboard 100. FIG. 2 illustrates the component functional test module 110, which is saved in an independent optional ROM 108 on the motherboard 100 and separate from the BIOS component basic diagnostic module 106. FIG. 3 illustrates the component functional test module 110, which is saved in a PCI optional ROM 108b (on a PCI card 107) and separate from the BIOS component basic diagnostic module 106. FIG. 4 illustrates the component functional test module 110, which is saved in BIOS optional ROM 108a and integrated with the BIOS component basic diagnostic module 106. No matter what embodiment is used, the component functional test module 110 can achieve the same result.

Figure 5:
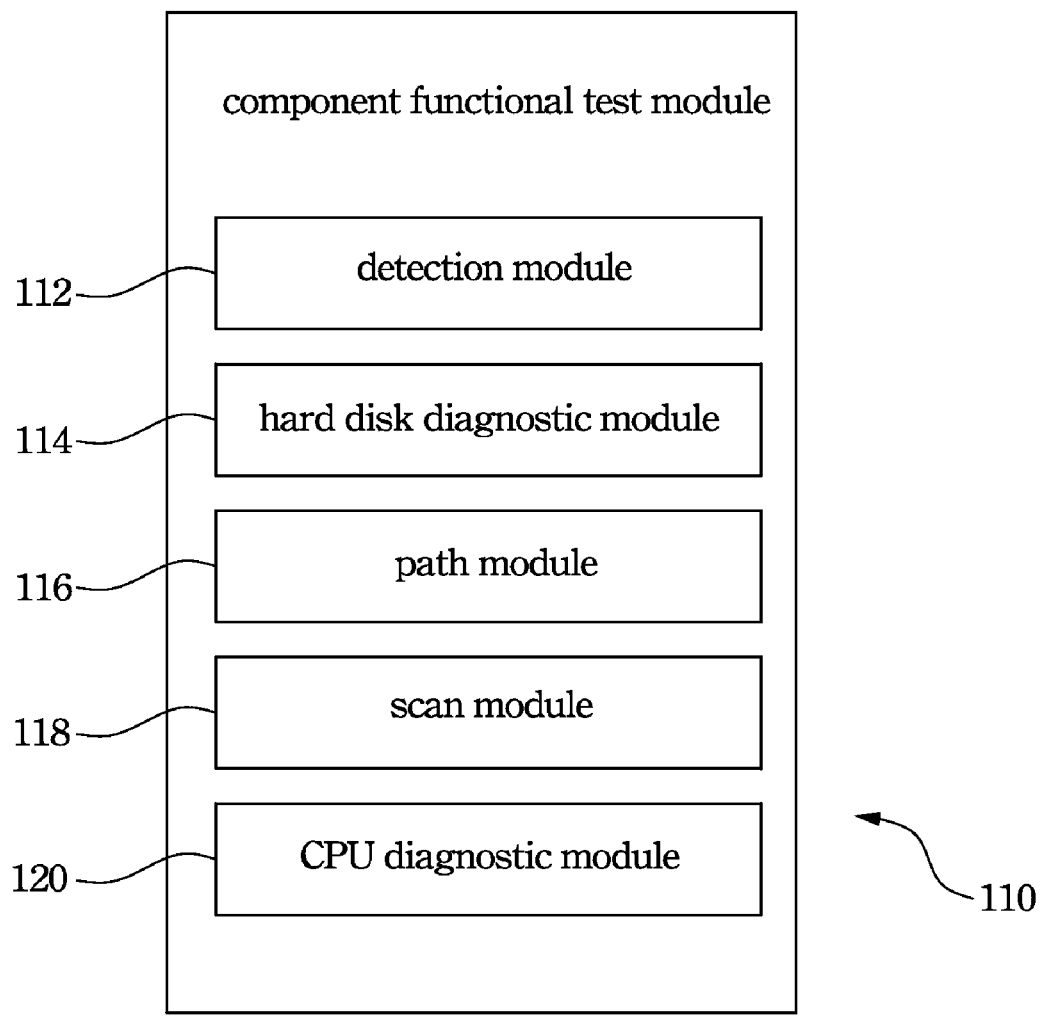
FIG. 5 illustrates a complete PC component diagnostic module according to one preferred embodiment of this invention.
Figure 6:
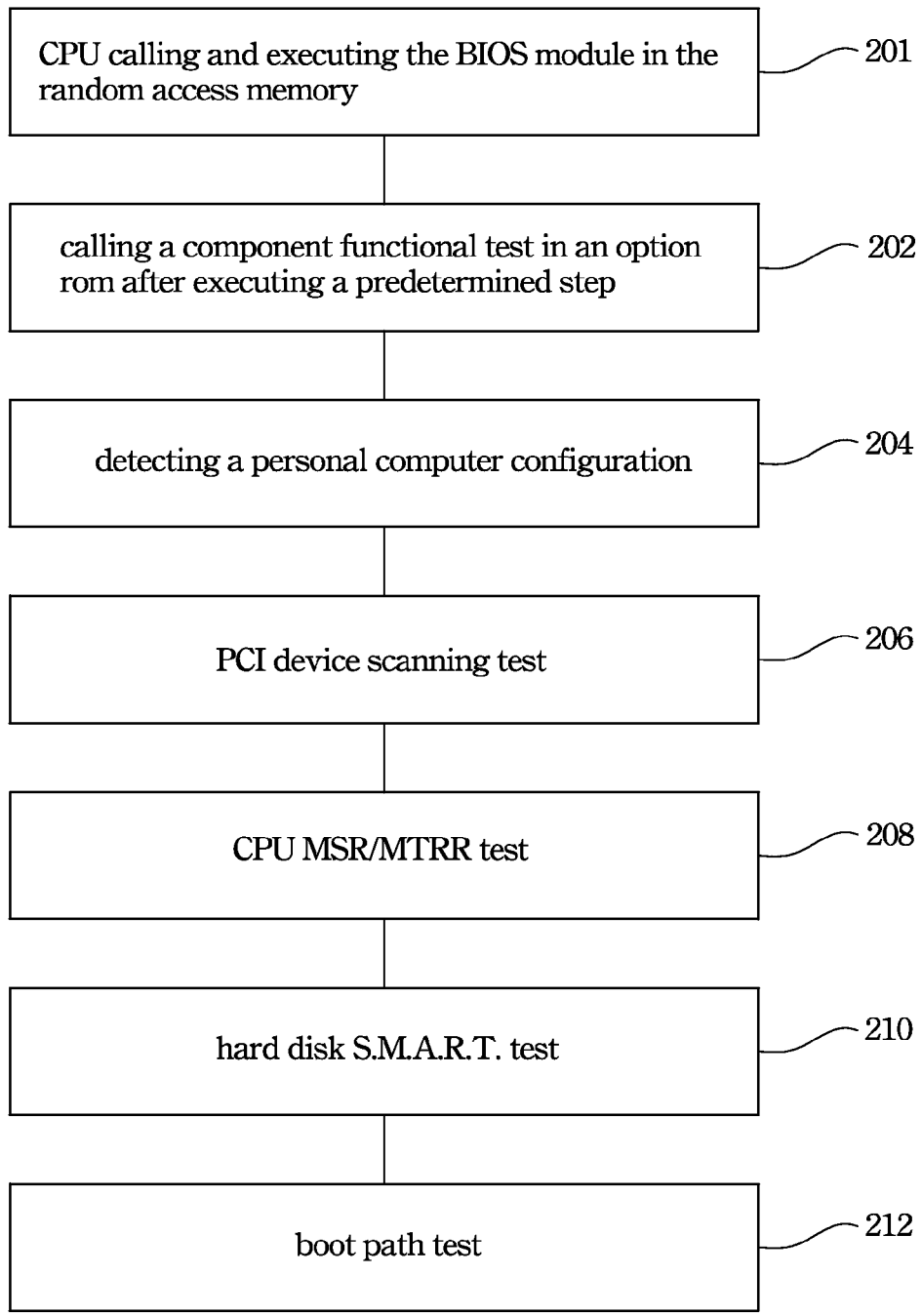
FIG. 6 is a flowchart of personal computer component functional test according to one preferred embodiment of this invention.

FIG. 5 illustrates a complete PC component diagnostic module according to one preferred embodiment of this invention. FIG. 6 is a flowchart of a personal computer component functional test according to one preferred embodiment of this invention.

In step 202, when the CPU 102 (illustrated in FIGS. 2, 3 and 4) calls the component functional test program, the component functional test program is duplicated in a random access memory 104 and decompressed. In order to preserve enough buffer memory to execute the component functional test, enough space (at least 512K) in the random access memory 104 should be confirmed first.

In step 204, a personal computer configuration is detected first so as to prepare the following steps of the component functional test program. This step is executed by a detection module 112 in FIG. 5.

In step 206, a scan module 118 of FIG. 5 executes a PCI device scanning test.

In step 208, a CPU diagnostic module 120 of FIG. 5 executes a CPU MSR (Module Specific Register)/MTRR (Memory Type Range Register) test.

In step 210, a hard disk diagnostic module 114 of FIG. 5 executes a S.M.A.R.T. (Self-Monitoring, Analysis, and Reporting Technology) test.

In step 212, a path module 116 of FIG. 5 executes a boot path test, i.e. a network boot component test.

Steps 206-212 can be executed without specific sequence and can be omitted according to demands. The component functional test can be launched by pressing a specific key, i.e. a button or switch connected with the PC system, selected in the BIOS, by a decision made by the component basic diagnostic program. After the component functional test is completed, the test result can be outputted by a display device, a log file containing error codes or a speaker. Users are able to recognize the computer status and potential problems as a reference source to fix the computer.

According to preferred embodiments of the present invention, this component diagnostic method can assist users or agents to recognize the computer status or potential problems without a Windows operating system such that a motherboard, a back bone system or a notebook PC need not be sent back to its supplier more often than not.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A personal computer component diagnostic method before an operating system is executed, the personal computer component diagnostic method comprising:
    calling a BIOS program;
    executing a component basic diagnostic program; and
    executing a component functional test after executing a predetermined step, the component functional test including a CPU MSR/MTRR test, a hard disk S.M.A.R.T. test, a boot path test, and a PCI device scanning test.

2. The personal computer component diagnostic method of claim 1, wherein the boot path test includes a network boot component test.

3. The personal computer component diagnostic method of claim 1, wherein the predetermined step is initializing a display device.

4. The personal computer component diagnostic method of claim 1, wherein the component functional test includes a step of detecting a personal computer configuration.

5. The personal computer component diagnostic method of claim 1, wherein the component functional test includes a step that prepares at least 512K in a random access memory.

6. The personal computer component diagnostic method of claim 5, wherein the random access memory is a static random access memory or a dynamic random access memory.

7. A personal computer component diagnostic module for executing a diagnostic method before an operating system is executed, the personal computer component module comprising:
    a random access memory;
    a BIOS module;
    a CPU for calling and executing the BIOS module in the random access memory; and
    a component functional test module for executing a component functional test after executing a predetermined step, the component functional test module including a CPU diagnostic module for executing a CPU MSR/MTRR test, a hard disk diagnostic module for executing a hard disk S.M.A.R.T. test, a path module for executing a boot path test, and a scan module for executing a PCI device scanning test.

8. The personal computer component diagnostic module of claim 7, wherein the component functional test module includes a detection module for detecting a personal computer configuration.

* * * * *